(12) United States Patent
Dazet et al.

(10) Patent No.: US 6,698,689 B1
(45) Date of Patent: Mar. 2, 2004

(54) AUXILIARY NOSE LANDING GEAR FOR AIRCRAFT

(75) Inventors: Francis Dazet, St Alban (FR); Danilo Ciprian, Aussonne (FR); Pascal Chaumel, Plausance du Touch (FR)

(73) Assignee: Aerospatiale Matra Airbus, Paris (FR)

( * ) Notice: Subject to any disclaimer, the term of this patent is extended or adjusted under 35 U.S.C. 154(b) by 0 days.

(21) Appl. No.: 09/699,685

(22) Filed: Oct. 31, 2000

(30) Foreign Application Priority Data

Dec. 8, 1999 (FR) .............................. 99 15467

(51) Int. Cl.$^7$ .............................................. B64C 25/34
(52) U.S. Cl. .................. 244/102 R; 244/103 R
(58) Field of Search ................... 244/100 R, 102 R, 244/102 A, 103 R, 102 SL, 104 FP

(56) References Cited

U.S. PATENT DOCUMENTS 2,394,496 A * 2/1946 Stephan .................. 244/102 R
2,759,739 A * 8/1956 Walsh ......................... 280/62
3,974,988 A   8/1976 Whitworth
4,359,199 A * 11/1982 Kramer et al. .......... 244/100 R

FOREIGN PATENT DOCUMENTS

EP         0 559 514         9/1993
GB           560316     *   3/1944

* cited by examiner

Primary Examiner—Peter M. Poon
Assistant Examiner—Timothy D. Collins
(74) Attorney, Agent, or Firm—Thelen Reid & Priest LLP

(57) ABSTRACT

The nose gear of an aircraft comprises a main group of at least one wheel (10) in permanent contact with the ground and a secondary group of at least one wheel (12), which is normally spaced from the ground, when the aircraft is on the ground. In the case of emergency braking due to an aborted takeoff or in the case of a blowout of a tire of a wheel (10) of the main group, the wheel or wheels (12) come into contact with the ground. This avoids an oversizing of the nose gear.

7 Claims, 5 Drawing Sheets

AUXILIARY NOSE LANDING GEAR FOR AIRCRAFT

TECHNICAL FIELD

The invention relates to an auxiliary nose landing gear for installation on an aircraft.

The auxiliary nose landing gear according to the invention can be used on all aircraft types and in particular on civil and military aircraft for transporting passengers and goods.

PRIOR ART

The landing gear of an aircraft is designed for withstanding the different loads transmitted between the aircraft and the ground and in order to permit the taxiing of the aircraft on landing, takeoff and during movements on the ground.

The loads which the landing gear have to withstand vary as a function of the aircraft loading conditions, the speed, possible braking and the trajectory (straight line or turning). Moreover, as a result of these different conditions there is a variation in the load distribution between the auxiliary nose landing gear (called "nose gear" throughout the remainder of the text) and the main landing gear (called "main gear" in the remainder of the text). Thus, when the aircraft is stationary, the static loads withstood by the nose gear are low (5 to 20% of the aircraft weight as a function of its geometry) compared with those withstood by the main gear. However, in certain dynamic phases, the loads withstood by the nose gear can become significant (sometimes roughly double the static loads). The nose gear then has to withstand a high compressive stress.

The standards imposed by the certification authorities strictly control the behaviour of each of the elements of an aircraft landing gear under both normal and exceptional conditions.

Thus, in the case of dynamic braking, the nose gear must be able to take up 30% of the load exerted in accordance with the vertical axis. When the aircraft is towed, the stress withstood by the nose gear is directed along the longitudinal axis of the aircraft. In the case of a crabwise landing, the nose gear must withstand a stress exerted in accordance with the lateral or transverse axis of the aircraft and whose level reaches 0.8 times the load withstood in accordance with the vertical axis. The nose gear must also withstand a high torque when oriented when the aircraft is stationary. The nose gear must also be dimensioned in such a way as to take account of the critical case of an aborted takeoff, which corresponds to an emergency braking when the aircraft is at its maximum weight and slightly below its takeoff speed. When this case occurs, the main gear sheds 30% of its load, which is transferred to the nose gear.

In addition, the loads transferred to the runway by the wheels of the landing gear must not exceed the maximum load threshold of said runway, which is in particular dependent on the surface used, the nature of the subsoil, etc.

Finally, the nose gear can be oriented in order to ensure the guidance of the aircraft during taxiing on the runway and when the aircraft speed is inadequate for guidance by the vertical rudder. In the case of a tyre burst, the aircraft may prove very difficult to guide.

In practice, designers have increased the number of wheels equipping the nose gear of aircraft in order to respect these different constraints and ensure a completely satisfactory behaviour of the aircraft on the ground. Thus, the nose gear of aircraft, whose weight on takeoff is below 250 tonnes is generally equipped with two wheels, whereas with aircraft having a takeoff weight exceeding 250 tones, they are normally equipped with nose gears having four wheels.

In other words, the nose gear of aircraft is oversized to take account of constraints only appearing during very short aircraft use phases. This oversizing of the nose gear more particularly relates to the number of wheels.

In this connection it should be noted that the cost resulting from changing worn landing gear tyres increases with the number of wheels equipping the nose gear. The nose gear strut must also be oversized to take account of the torsional moments produced by the skidding of tyres on the runway when turning.

DESCRIPTION OF THE INVENTION

The invention specifically relates to an aircraft nose gear, whose original design makes it possible for it to only use a limited number of wheels under normal landing, takeoff and taxiing conditions, so that the dimensioning of the gear strut and the cost of changing tyres can be reduced compared with the nose gears which at present equip aircraft.

According to the invention, this result is obtained by means of an auxiliary nose landing gear for the aircraft, which comprises a main group of at least one wheel which can be in permanent contact with the ground when the aircraft is on the ground, said gear being characterized in that it also comprises a secondary group of at least one wheel, which can normally be spaced from the ground when the aircraft is on the ground, when the loads transmitted through the gear do not exceed a predetermined threshold and the main group is operational.

In other words, the nose gear according to the invention comprises a main group of at least one wheel in permanent contact with the runway when the aircraft is on the ground and a secondary group of at least one wheel only coming into contact with the runway and only withstanding loads under critical operating conditions such as emergency braking resulting from an aborted takeoff or under abnormal conditions such as e.g. the bursting of a tyre of a wheel of the main group.

Under normal conditions, only the wheel or wheels of the main group are consequently used and become worn. However, the presence of the wheel or wheels of the secondary group make it possible to maintain the control of the trajectory of the aircraft, particularly in the case of a tyre bursting and to uniformly distribute the loads over the runway when they increase beyond a certain threshold.

In a preferred embodiment of the invention, the nose gear comprises a gear leg having a substantially vertical longitudinal axis when the aircraft is on the ground, each wheel of the main group being installed at the lower end of the gear leg and each wheel of the secondary group being installed on at least one articulated arm at the lower end of the gear leg. Actuating means are then interposed between the arm and the gear leg in order to pivot the arm between an extended position and a retracted position.

In order to lock each wheel of the secondary group in a position such that it remains in contact with the ground when it is active, abutment means are advantageously provided to serve as a support for the arm when in the extended position.

When the aircraft is on the ground and with the arm in the extended position, each wheel of the secondary group can be displaced either forwards or rearwards with respect to each wheel of the main group.

In a comparable manner, when the landing gear is retracted and when the arm is in the retracted position, each wheel of the secondary group can be displaced forwards or rearwards with respect to each wheel of the main group.

To ensure a better support on the ground, the axle of each wheel of the main group is advantageously offset slightly forwards or rearwards with respect to the longitudinal axis of the gear leg when the aircraft is on the ground.

In the preferred embodiment of the invention each wheel of the secondary group has a diameter smaller than that of each wheel of the main group. This arrangement leads to a considerable space and weight gain.

BRIEF DESCRIPTION OF THE DRAWINGS

The invention is described in greater detail hereinafter relative to non-limitative embodiments and with reference to the attached drawings, wherein show.

DETAILED DESCRIPTION OF SEVERAL PREFERRED EMBODIMENTS OF THE INVENTION

Throughout the description the terms "front" and "rear" must be interpreted using as the reference the aircraft on which the nose gear is installed.

Figure 1A:
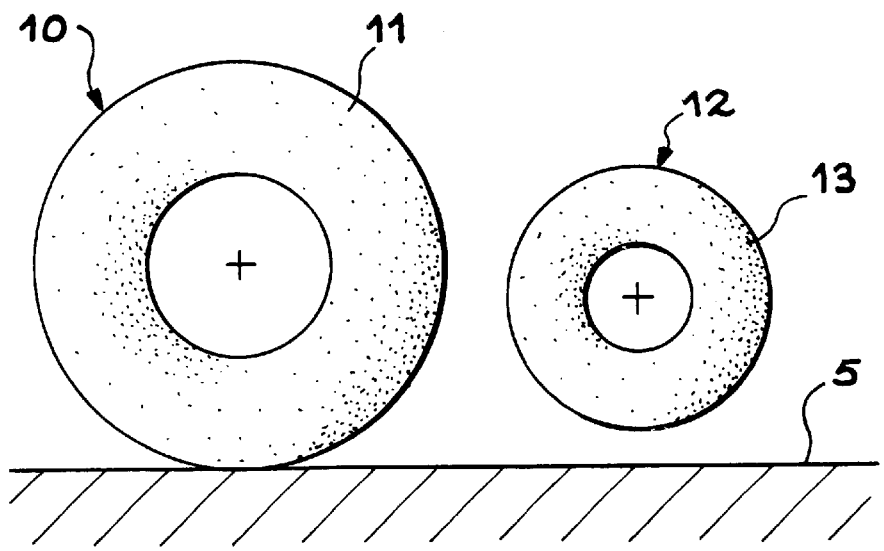
FIGS. 1A & 1B Very diagrammatically a wheel of the main group and a wheel of the secondary group of a nose gear according to the invention, respectively in the case of normal taxiing and in the case of emergency braking or a blowout.
Figure 1B:
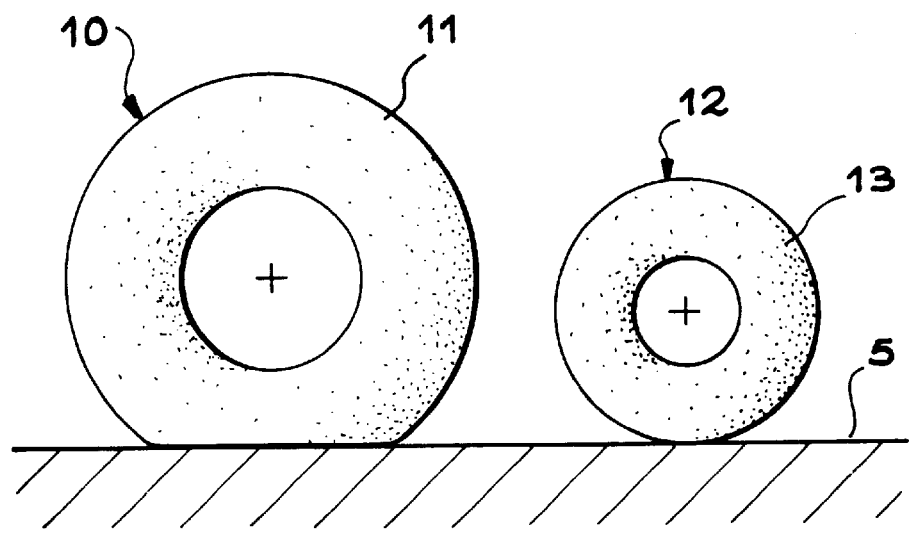

As is very diagrammatically illustrated in FIGS. 1A and 1B, the auxiliary nose landing gear according to the invention comprises a main group formed by at least one wheel 10 and a secondary group also formed by at least one wheel 12.

When the landing gear is extended, the lower generatrix of each wheel 12 of the secondary group is displaced upwards by a predetermined distance with respect to the lower generatrix of each wheel 10 of the main group.

Consequently when the gear is extended and the aircraft is on the ground, each wheel 10 of the main group is in permanent contact by its tyre 11 with the ground. However, under normal aircraft taxiing conditions, as illustrated in FIG. 1A, each wheel 12 of the secondary group is not in contact with the ground 5. Under exceptional conditions such as emergency braking following an aborted takeoff or a blowout on a wheel 10 of the main group, the tyre 11 of wheel 10 is deformed in such a way that the tyre 13 of each wheel 12 of the secondary group also bears on the ground 5, as illustrated in FIG. 1B.

Due to the fact that the wheel or wheels 12 of the secondary group constitute back-up wheels only active in critical cases where the wheel or wheels 10 of the main group are flattened more than in normal operation, each wheel 12 of the secondary group is advantageously given a smaller diameter than that of each wheel 10 of the main group. This feature gives a significant space and weight gain compared with the nose gear of existing aircraft.

A description will now be given in greater detail with reference to FIGS. 2 and 3 of the architecture of the nose gear in a first embodiment of the invention.

The nose gear leg, designated in general terms by the reference 14, has a longitudinal axis A oriented substantially vertically when the gear is extended. The gear leg 14 more particularly comprises a strut 16 integrating a main shock absorber. At its lower end, the strut 16 comprises a bracket 18 able to support the wheel or wheels 10 of the main group by an axle 20.

A direction actuator 22 installed on the strut 16 makes it possible to orient the bracket 18 carrying the wheel or wheels 10 of the main group about the longitudinal axis A of the gear leg 14.

Figure 2:
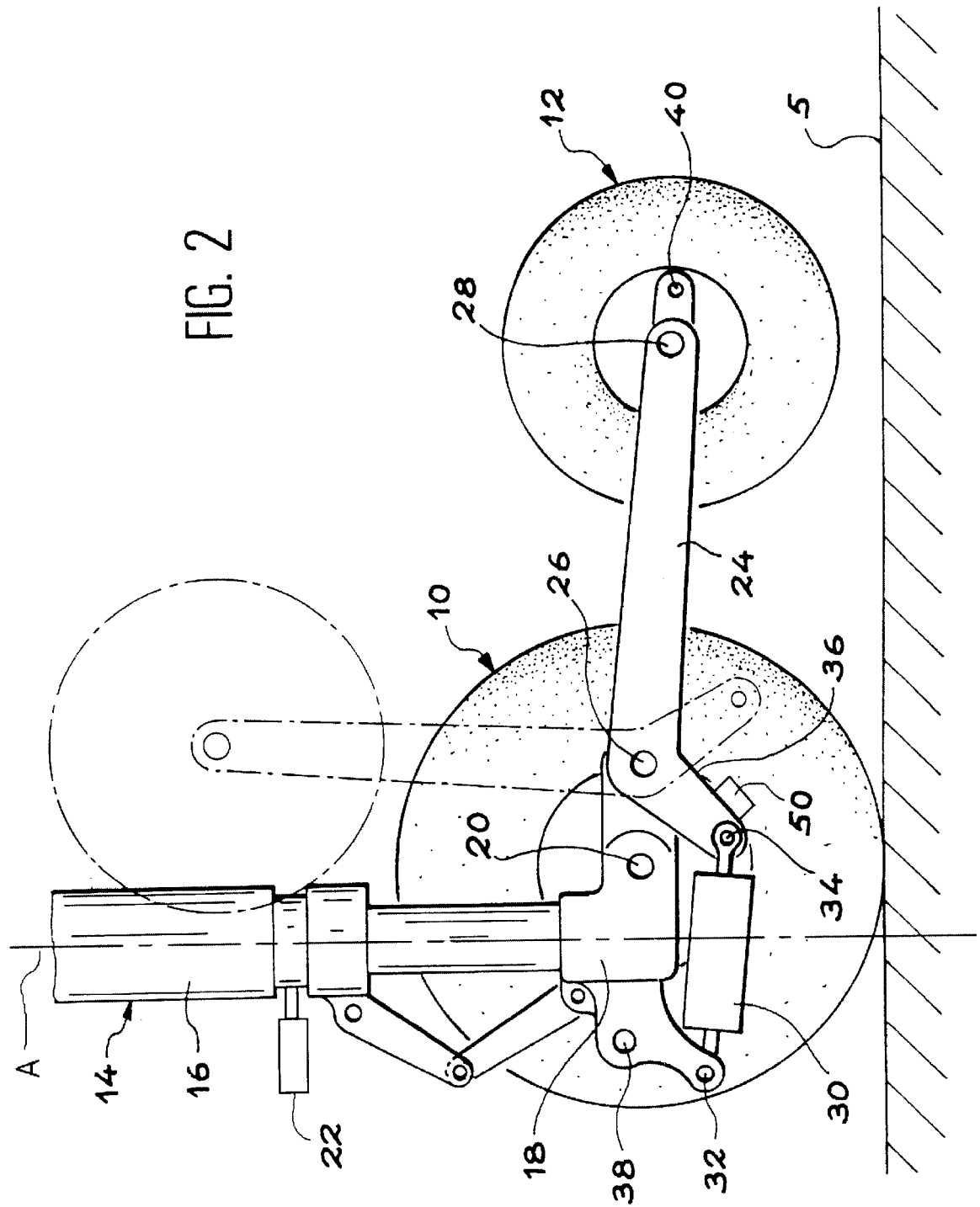
FIG. 2 A side view showing the end of the nose gear in accordance with a first embodiment of the invention.

The nose gear illustrated in FIG. 2 also comprises an arm 24, whereof a first end is articulated on the bracket 18 by a pivot pin 26 oriented parallel to the axle 20 and whose opposite end supports the wheel or wheels 12 of the secondary group by an axle 28 parallel to the axle 20 and pin 26.

An actuator 30 such as e.g. a hydraulic jack is interposed between the bracket 18 and the arm 24, so as to be able to control a pivoting of the latter about the pin 26, between an extended position illustrated in continuous line form in FIG. 2 and a retracted position illustrated in mixed line form.

More specifically, a first end of the actuator 30 is articulated on the bracket 18 by a pivot pin 32. The opposite end of the actuator 30 is articulated by a pivot pin 34 on a rod 36 integral with the end of the arm 24 articulated on the pin 26. The pins 32 and 34 are oriented parallel to members 20, 26 and 28 and the longitudinal axis of the actuator 30 is displaced downwards with respect to the pivot pin 26 of arm 24. Consequently operation of the actuator 30 in one or other direction leads to a pivoting of the arm 24 between its extended position and its retracted position.

A hole 38 made in the front of the bracket 18 and a hole 40 made on an excrescence extending the arm 24 beyond the axle 28 respectively constitute a front anchor point and a rear anchor point used for towing the aircraft.

Figure 3:
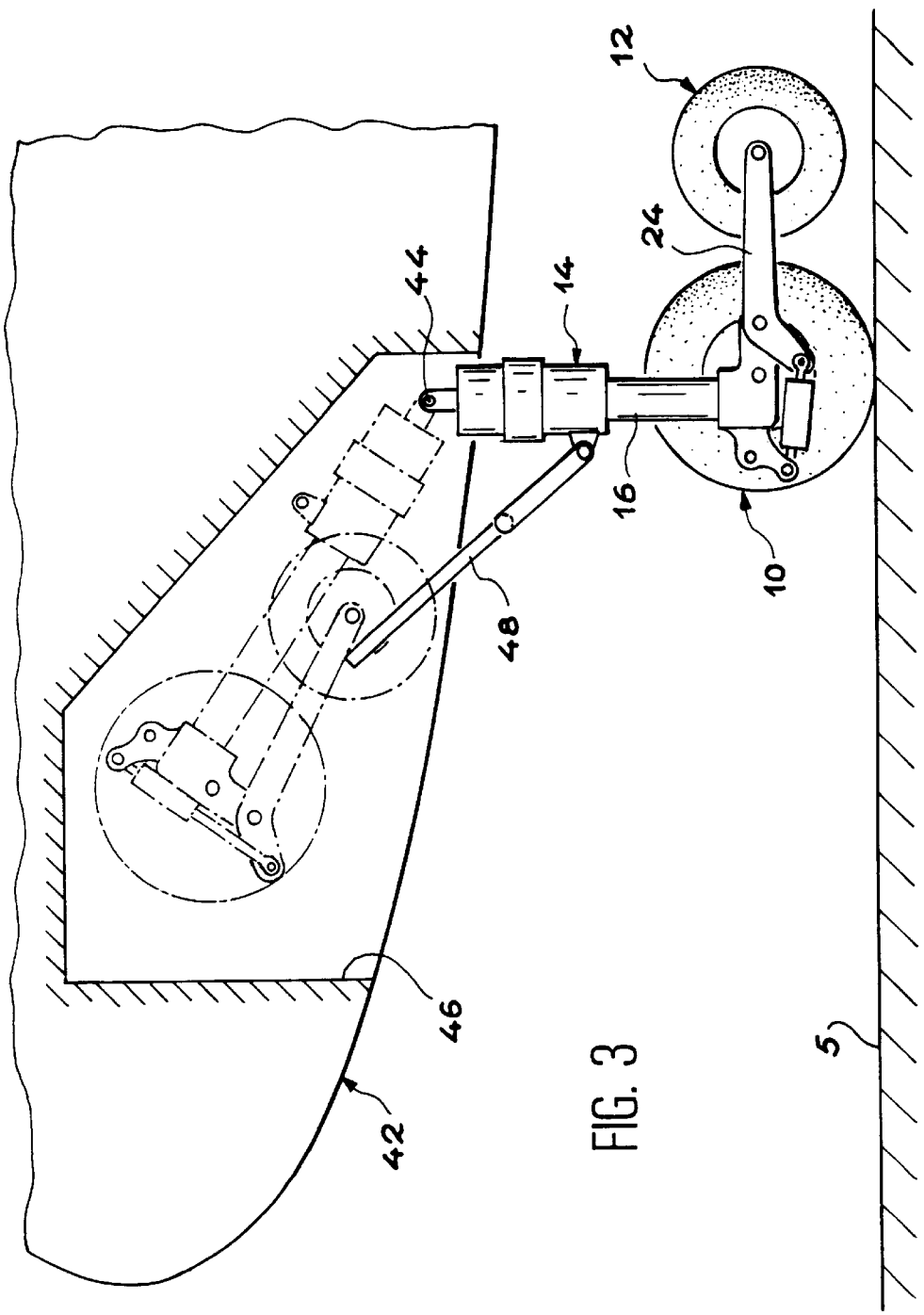
FIG. 3 A side view diagrammatically illustrating the first embodiment of the invention in which the auxiliary group is placed behind the main group when the gear is retracted (in mixed line form) and when the gear is extended (in continuous line form).

As is diagrammatically illustrated in FIG. 3, the upper end of the gear leg 14 is articulated on the structure of the body 42 by a pivot pin 44 oriented transversely or laterally with respect to the aircraft. This arrangement makes it possible to retract the nose gear into a wheel well 46 in the lower front part of the body 42. The displacement of the nose gear between its extended state illustrated in continuous line form and its retracted state illustrated in mixed line form is controlled in known manner by one or more actuators 48.

In the first embodiment of the invention diagrammatically illustrated in FIGS. 2 and 3, the wheel or wheels 12 of the secondary group are placed to the rear of the wheel or wheels 10 of the main group when the gear is extended, i.e. when the arm 24 is brought into its extended position following the operation of actuator 30.

When the nose gear is retracted, as illustrated in mixed line form in FIG. 3, the arm 24 occupies its retracted position, i.e. it is swung upwards along the gear leg 14 by operating the actuator 30. Under these conditions, when the gear leg 14 has pivoted forwards about its pin 44 by operating actuator 48, the wheel or wheels 12 of the secondary group are placed to the rear of the wheel or wheels 10 of the main group, within the wheel well 46.

In the first embodiment of the invention illustrated in FIGS. 2 and 3, the axle 20 of the wheel or wheels 10 of the main group is displaced slightly rearwards with respect to the longitudinal axis A of the gear leg 14. This arrangement brings about a better support on the ground of the wheels 10 of the main group.

To keep the wheel or wheels 12 of the secondary group in their active position corresponding to the extended position of arm 24, retractable abutment means 50 are automatically controlled by the actuator 30 when the arm 24 is extended. These abutment means then bring about a mechanical abutment locking the arm 24 in a position such that the wheel or wheels 12 remain in contact with the ground when they become active, in the manner illustrated in FIG. 1B.

Figure 4:
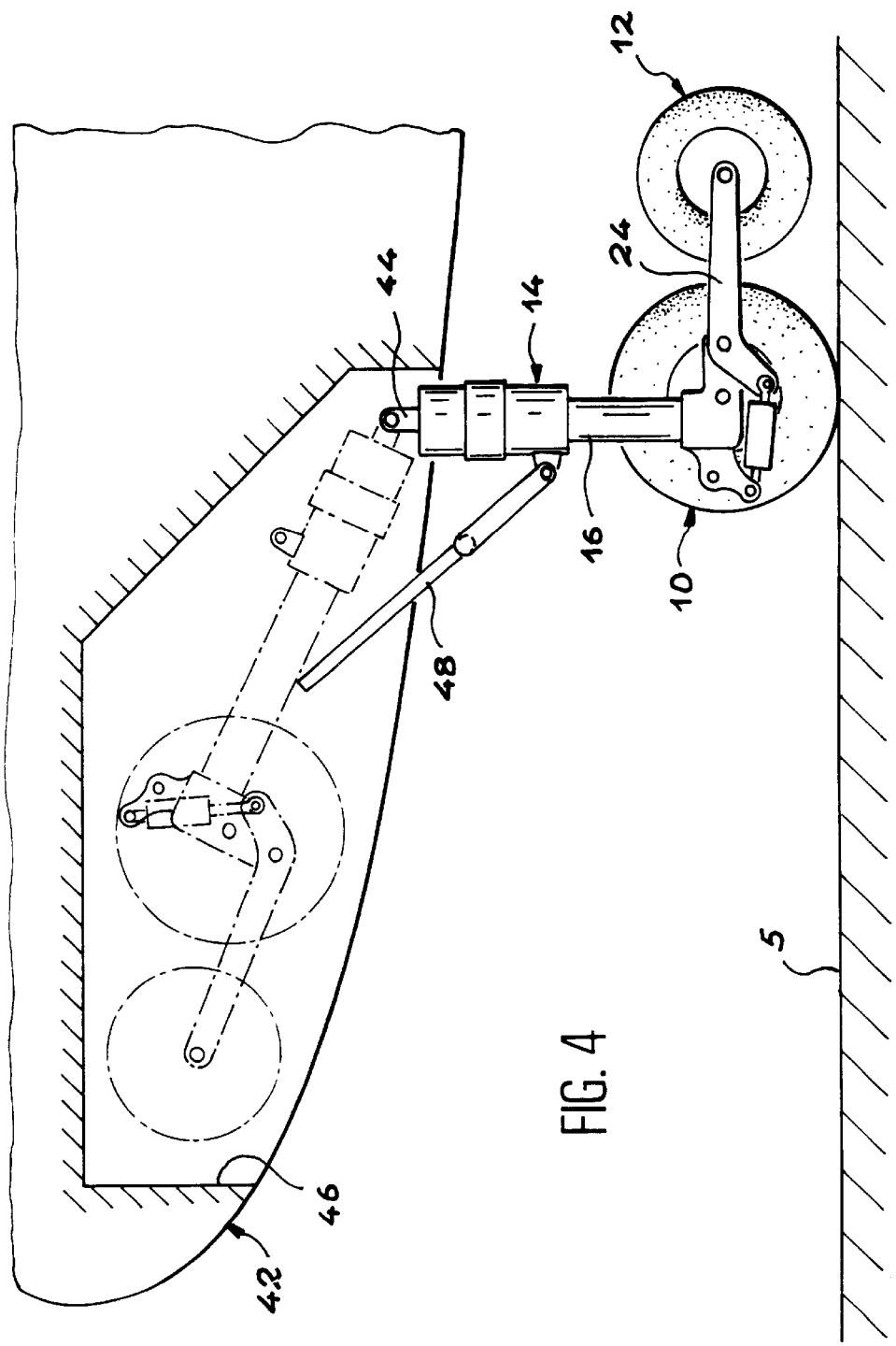
FIG. 4 A view comparable to FIG. 3 illustrating a second embodiment of the invention in which the auxiliary group is placed in front of the main group when the gear is retracted (in mixed line form) and behind the main group when the gear is extended (in continuous line form).

In a second embodiment of the invention diagrammatically illustrated in FIG. 4, the nose gear has a configuration identical to that of the first embodiment described hereinbefore, when the gear is extended. In other words, the wheel or wheels 12 of the secondary group are placed to the rear of the wheel or wheels 10 of the main group, when the aircraft is on the ground.

However, the retracted state of the nose gear is different. Thus, instead of being housed in the wheel well 46 to the rear of the wheel or wheels 10 of the main group, the wheel or wheels 12 of the secondary group are positioned in front of them. In other words, instead of controlling an upward pivoting of the arm 24 about the pin 26, the effect of the actuator 30 is then to pivot the arm 24 downwards, so that it is positioned substantially in the extension of the gear leg 14.

In both this embodiment and the previous one, it should be noted that the pivoting of the arm 24 can be controlled simultaneously with that of the gear leg 14 or before or after the latter.

Figure 5:
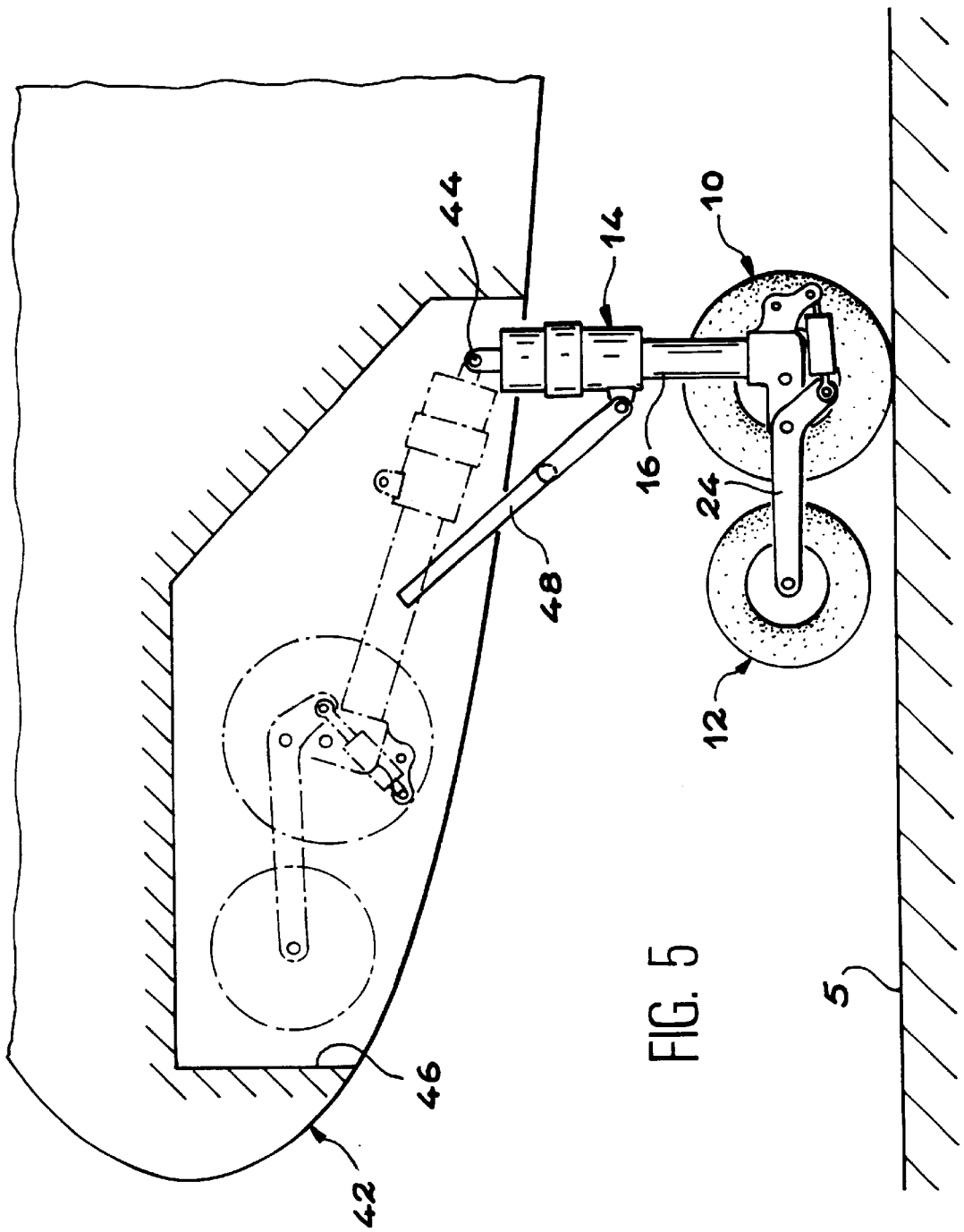
FIG. 5 A view comparable to FIGS. 3 and 4 illustrating a third embodiment of the invention, in which the auxiliary group is placed in front of the main group both when the nose gear is retracted (in mixed line form) and when it is extended (in continuous line form).

In a third embodiment of the invention diagrammatically illustrated in FIG. 5, the retracted state of the nose gear is identical to that of the second embodiment described hereinbefore with reference to FIG. 4. Conversely, the arrangement of the nose gear is different in its extended state. Thus, instead of being placed, as hereinbefore, to the rear of the wheel or wheels 10 of the main group, the wheel or wheels 12 of the secondary group are in this case positioned in front of them.

In said third embodiment of the invention illustrated in FIG. 5, the axle 20 of the wheel or wheels 10 of the main group is slightly forwardly displaced with respect to the longitudinal axis A of the gear leg 14. This arrangement, which is the reverse of that of the first and second embodiments of the invention, also makes it possible to improve the support on the ground of the nose gear.

In general terms, the axle 20 of each wheel 10 of the main group can be displaced either to the front or to the rear with respect to the longitudinal axis A of the gear leg 14, no matter what the relative positioning between the wheels 10 and 12 in the extended state and in the retracted state of the gear.

In the second and third embodiments of the invention respectively described with reference to FIGS. 4 and 5, the retractable abutment means used in the first embodiment to serve as a support for the arm 24 when it is extended can be replaced by a fixed, mechanical abutment located directly on the bracket 18.

In all cases, a fixed or retractable abutment can also be provided for maintaining the arm 24 in its retracted position.

No matter what the embodiment and in the manner described with reference to FIGS. 1A and 1B, the nose gear according to the invention is arranged in such a way that normally only the wheel or wheels 10 of the main group are in contact with the ground when the aircraft is on the ground.

In view of the fact that wear to tyres mainly occurs when taxiing, particularly due to the significant friction occurring when turning, the wheel or wheels of the secondary group do not wear, because they are not used during this phase.

However, under certain conditions, such as a particularly intense braking action or the bursting of the tyre of a wheel of the main group, the tyre 11 is flattened and the wheel or wheels 12 of the secondary group become active. In other words, each wheel 12 of the secondary group is then associated with the wheel or wheels of the main group on entering into contact with the ground. If the number of wheels of each of the two groups is the same, the load withstood by each of the wheels of the main group is consequently divided by two. Moreover, if one of the tyres bursts, there still remains an adequate number of wheels to allow the control of the trajectory of the aircraft on the ground to be maintained.

The two positions which may be assumed by the wheels of the secondary group during the retraction of the nose gear, either along the strut 16 of the gear (FIG. 3) or in the extension of said strut (FIGS. 4 and 5), makes it possible to significantly reduce the overall dimensions of the nose gear when it is retracted. In particular, the space taken up by the wheel or wheels of the secondary group in the wheel well, in the lateral or transverse direction, is smaller than in the case of a conventional nose gear.

Due to the fact that the wheel or wheels 12 of the secondary group are not normally in contact with the ground when the aircraft is stationary, a forced orientation of the wheels then takes place as if only the wheel or wheels 10 of the main group were present.

It should be noted that the presence of the second group can be used for facilitating the changing of a wheel of the main group. Thus, the displacement or path of the actuator 30 can make the wheel or wheels 12 of the secondary group bear on the ground and then raise the wheel or wheels 10 of the main group, so as to permit the replacement thereof.

Each wheel 12 of the secondary group can also be easily replaced, because it is not normally in contact with the ground.

As has been stated hereinbefore, both the main and secondary groups can comprise one or more wheels and the number of wheels of each of the groups can be the same or different, without passing beyond the scope of the invention.

In addition, the different arrangements proposed in the three embodiments described are only given in exemplified manner. It is therefore clear that the wheel or wheels of the secondary group can also be placed to the front of the wheel or wheels of the main group when the nose gear is in the extended state and to the rear of said same wheels in the retracted state of the nose gear.

What is claimed is:

1. Auxiliary nose landing gear for an aircraft, comprising:
 a main group of at least one wheel;
 a secondary group of at least one wheel;
 said secondary group being connected to said main group by means comprising an arm and a pivot pin so that when said secondary group is in an extended position said secondary group is locked in a vertical position relative to said main group; and, an actuator to move said secondary group to a retracted position and to an extended position.

2. An auxiliary nose landing gear for an aircraft according to claim 1, further comprising abutment means connected to said arm to prevent said arm from moving when said arm is in the extended position.

3. An auxiliary nose landing gear for an aircraft according to claim 1, wherein when said secondary group is in the retracted position and said main group is in the extended position said secondary group is higher than said main group.

4. An auxiliary nose landing gear for an aircraft according to claim 1, wherein the wheel of said secondary group is smaller than the wheel of said main group.

5. Auxiliary nose landing gear for an aircraft, comprising:
a main group of at least one wheel; and,
a secondary group of at least one wheel;
said secondary group being connected to said main group by means comprising an arm and a pivot pin so that when said secondary group is in an extended position, and said main group is intact, and said aircraft is stationary on the runway, none of the wheels of said secondary group contact the runway.

6. An auxiliary nose landing gear for an aircraft according to claim 5, further comprising an actuator connected to said arm to locate said secondary group in a location so as not to contact the runway.

7. An auxiliary nose landing gear for an aircraft according to claim 5, further comprising abutment means to maintain said secondary group in a location so as not to contact the runway.

* * * * *